US012285886B2

(12) United States Patent
Kotz-Helmer et al.

(10) Patent No.: US 12,285,886 B2
(45) Date of Patent: Apr. 29, 2025

(54) MANUFACTURING OF A METAL MOLD FOR REPLICATING A COMPONENT HAVING A PREDETERMINED THREE-DIMENSIONAL SHAPE

(71) Applicant: Glassomer GmbH, Freiburg im Breisgau (DE)

(72) Inventors: Frederik Kotz-Helmer, March (DE); Bastian Rapp, Freiburg (DE)

(73) Assignee: GLASSOMER GMBH, Freiburg im Breisgau (DE)

( * ) Notice: Subject to any disclaimer, the term of this patent is extended or adjusted under 35 U.S.C. 154(b) by 52 days.

(21) Appl. No.: 18/549,117

(22) PCT Filed: Mar. 28, 2022

(86) PCT No.: PCT/EP2022/058114
§ 371 (c)(1),
(2) Date: Sep. 5, 2023

(87) PCT Pub. No.: WO2022/200628
PCT Pub. Date: Sep. 29, 2022

(65) Prior Publication Data
US 2024/0157608 A1    May 16, 2024

(30) Foreign Application Priority Data
Mar. 26, 2021 (EP) .................. 21165146

(51) Int. Cl.
*B29C 33/38* (2006.01)
*C03B 19/06* (2006.01)

(52) U.S. Cl.
CPC ...... *B29C 33/3857* (2013.01); *B29C 33/3892* (2013.01); *B29K 2905/00* (2013.01); *C03B 19/066* (2013.01)

(58) Field of Classification Search
CPC . B29C 33/3857; B29C 33/38; B29C 33/3892; B29K 2905/00; C03B 19/066; B22C 7/00
See application file for complete search history.

(56) References Cited

U.S. PATENT DOCUMENTS 3,732,181 A * 5/1973 Ray .................... C03C 3/19
523/307
5,085,938 A * 2/1992 Watkins ............ C03C 25/26
524/588

(Continued)

FOREIGN PATENT DOCUMENTS

CN    101528619 A  *  9/2009  ............ C03B 19/06
CN    108516818 A  *  9/2018  ............ C04B 35/44

(Continued)

OTHER PUBLICATIONS

Richter et al.; "Fast and cheap fabrication of molding tools for polymer replication", Feb. 28, 2017; Progress in Biomedical Optics and Imaging, SPIE—International Society for Optical Engineering, vol. 10061, pp. 100610D-100610D (Year: 2017).*

(Continued)

*Primary Examiner* — Bayan Salone
(74) *Attorney, Agent, or Firm* — McDonnell Boehnen Hulbert & Berghoff LLP

(57) ABSTRACT

The present invention relates to a method of manufacturing a metal mold for replicating a component having a predetermined three-dimensional shape, the manufacturing method comprising: (a) fabricating a glass-based mold by using a moldable nanocomposite comprising an organic binder and glass particles dispersed therein, the glass-based mold having the predetermined three-dimensional shape; and (b) replicating the glass-based mold obtained in step (a) by melting a metal inside the glass-based mold or by melting a metal outside the glass-based mold and pouring it onto or into the glass-based mold, followed by cooling, or by (Continued)

pressing the glass-based mold into a malleable metal substrate, thereby obtaining the metal mold for replicating the component, the metal mold having the predetermined three-dimensional shape inverted. Further, the present invention relates to a method of replicating a component having a predetermined three-dimensional shape, wherein the metal mold obtained by the manufacturing method is used for replicating the component, wherein the glass particles of the moldable nanocomposite comprise a first type of glass particles having a diameter in the range from 5 nm to 500 nm.

20 Claims, 3 Drawing Sheets

(56) References Cited

U.S. PATENT DOCUMENTS

| | | | | |
|---|---|---|---|---|
| 10,940,639 | B1 * | 3/2021 | Okpowe | B29C 64/314 |
| 10,954,155 | B2 * | 3/2021 | Rapp | C03C 3/06 |
| 2020/0024465 | A1 * | 1/2020 | Dylla-Spears | B33Y 70/10 |

FOREIGN PATENT DOCUMENTS

| | | | | | |
|---|---|---|---|---|---|
| CN | 109650853 | A | * | 4/2019 | A61C 7/14 |
| CN | 109996767 | A | * | 7/2019 | B29C 64/165 |
| CN | 111454067 | A | * | 7/2020 | C04B 35/10 |
| CN | 111499371 | A | * | 8/2020 | |
| CN | 112299828 | A | * | 2/2021 | |
| KR | 20170058048 | A | * | 5/2017 | C04B 35/443 |
| WO | 200048775 | A2 | | 8/2000 | |
| WO | 2018065093 | A1 | | 4/2018 | |
| WO | WO-2018085093 | A1 | * | 5/2018 | C09D 183/16 |
| WO | WO-2020120458 | A1 | * | 6/2020 | B32B 18/00 |
| WO | WO-2020200424 | A1 | * | 10/2020 | B28B 1/001 |
| WO | WO-2022053632 | A1 | * | 3/2022 | C03B 19/06 |
| WO | WO-2022200627 | A1 | * | 9/2022 | B33Y 10/00 |
| WO | WO-2022200629 | A1 | * | 9/2022 | C04B 35/115 |

OTHER PUBLICATIONS

Schilardi et al.; "Micro-transfer molding using metallic stamps", Dec. 31, 2003; The Journal of the Argentine Chemical Society, vol. 91, No. 1, pp. 143-152 (Year: 2003).*

Kotz et al.; "High-throughput thermal replication of transparent fused silica glass", Mar. 4, 2019; Progress in Biomedical Optics and Imaging, SPIE—International Society for Optical Engineering, Bellingham, WA, US, vol. 10875, pp. 1087503-1087503, (Year: 2019).*

Dillon et al., "Mechanism of "Solid-State" Single-Crystal Conversion in Alumina", J. Am. Ceram. Soc., 2007, vol. 90, No. 3, pp. 993-995.

Gilde et al., "Evaluation of Hot Pressing and Hot Isostastic Pressing Parameters on the Optical Properties of Spinel", J. Am. Ceram. Soc., 2005, vol. 88, No. 10, pp. 2747-2751.

Lu et al., "Fabrication of Translucent Alumina Ceramics from Pre-Sintered Bodies Infiltrated with Sintering Additive Precursor Solutions", Journal of the European Ceramic Society, 2012, vol. 32(4), pp. 711-715.

Wang et al., "3D Printing of Transparent Spinal Ceramics with Transmittance Approaching the Theoretical Limit", Adv. Mater., 2021, vol. 33, pp. 1-9.

Krell, A. et al., "Transparent Sintered Corundum with High Hardness and Strength," Journal of the American Ceramic Society, vol. 86(1), pp. 12-18 (2003).

Scott, C. et al., "Conversion of Polycrystalline Al2O3 into Single-Crystal Sapphire by Abnormal Grain Growth," Journal of the American Ceramic Society, vol. 85(5), pp. 1275-1280 (2002).

Kotz et al., "Glassomer—Processing Fused Silica Glass Like a Polymer," Advanced Materials, 2018, vol. 30, 1707100, pp. 1-5.

Minehan W.T. et al., "Titania-Silica Glasses Prepared by Sintering Alkoxide Derived Spherical Colloids," Journal of Non-Crystalline Solids, vol. 108, pp. 163-168 (1989).

Chu et al., "Silica Optical Fiber Drawn from 3D Printed Preforms", Optics Letters, 2019, vol. 44, No. 21, pp. 5358-5361.

International Preliminary Report on Patentability mailed Oct. 5, 2023, in International Application No. PCT/US2022/058114, 8 pages.

Extended European Search Report dated Sep. 15, 2021 issued in European Patent Application No. 21165146.8.

Richter et al., "Fast and Cheap Fabrication of Molding Tools for Polymer Replication", Proc. SPIE, Microfluidics, BioMEMS, and Medical Microsystems XV, 2017, vol. 10061, pp. 1-6.

Schilardi et al., "Microtransfer Molding Using Metallic Stamps", The Journal of the Argentine Chemical Society, 2003, vol. 91, No. 1, pp. 143-152.

Kotz et al., "High-Throughput Thermal Replication of Transparent Fused Silica Glass", Proc. SPIE, Microfluidics, BioMEMS, and Medical Microsystems XVII, 2019, vol. 10875, pp. 1-6.

International Search Report and the Written Opinion of the International Searching Authority, or the Declaration dated Jul. 5, 2022 issued in International Patent Application No. PCT/EP2022/058114.

* cited by examiner

MANUFACTURING OF A METAL MOLD FOR REPLICATING A COMPONENT HAVING A PREDETERMINED THREE-DIMENSIONAL SHAPE

CROSS-REFERENCE

This application is a 371 U.S. national phase of PCT/2022/058114, filed Mar. 28, 2022, which claims priority from EP application no. 21165146.8, filed Mar. 26, 2021, both which are incorporated by reference in its entirety.

FIELD OF THE INVENTION

The present invention relates to a method of manufacturing a metal mold for replicating a component having a predetermined three-dimensional shape. Further, the present invention relates to a method of replicating a component having a predetermined three-dimensional shape.

BACKGROUND OF THE INVENTION

Polymeric components, i.e. components made of a polymeric material, can be manufactured on an industrial scale by replication processes. In contrast to subtractive or additive manufacturing processes, replication processes such as injection molding, for instance, allow the fast and scalable manufacturing of polymeric components as they do not require any shape-defining step during the manufacturing. That is, in these replication processes, a thermoplastic or a resin is injected into a molding tool and then hardened, with the molding tool already defining the final three-dimensional shape of the polymeric component. In contrast to thermoplastics, resins can result in a crosslinked structure when hardened.

As mentioned above, in order to obtain the polymeric component, the thermoplastic or the resin which is in a moldable state when injected into the molding tool needs to be hardened. In case of thermoplastics, hardening is achieved upon cooling, which turns the softened thermoplastic into the polymeric component having the final three-dimensional shape. In case of resins, hardening is achieved upon curing or polymerizing initiated by an external stimulus such as heat or irradiation, which turns the liquid constituent(s) of the resin into the polymeric component having the final three-dimensional shape. Since the final three-dimensional shape of the polymeric component is determined in advance by the shape of the molding tool, it is commonly referred to as predetermined three-dimensional shape. As a matter of course, the shape of the molding tool is the inverse of the final three-dimensional shape of the polymeric component. In other words, the molding tool has the predetermined three-dimensional shape inverted.

Replication processes like injection molding, for instance, allow the shaping of very intricate structures which are only limited by the surface properties of the molding tool. In this context, metal molds have been proven to be particularly suitable as molding tools, since they have sufficient durability so that they can be used over a long period of time for manufacturing thousands of polymeric components using the same molding tool.

With costs of over 10,000 EUR to several million EUR per molding tool, the manufacturing of metal molds is the cost-relevant step in the manufacturing of polymeric components by replication processes. At present, most of the metal molds used in industry are obtained by subtractive manufacturing, in particular CNC machining techniques such as milling, drilling or grinding. Additive manufacturing has gained increased popularity in fast mold manufacturing, a process which is commonly referred to as rapid tooling. However, given the inadequate surface properties, e.g. high roughness and presence of defects, which usually result from additive manufacturing of metals, rapid tooling is not widely applicable on an industrial scale as of yet.

In this context, C. Richter et al., Progress in Biomedical Optics and Imaging, 2017, vol. 10061, describes a fabrication process of molding tools for polymer replication, the process comprising: generating a microstructure in a photoresist via lithography; casting the microstructure into a high-temperature silicone which serves as an original mold for creation of a metal molding tool; and melting an eutectic alloy of Sn, Ag and Cu under light pressure directly inside of the silicone within an oven to obtain the metal molding tool after cooling to room temperature.

Further, P. L. Schilardi et al., Journal of the Argentine Chemical Society, 2003, vol. 91, pages 143-152, describes a microtransfer molding using metallic stamps. Moreover, F. Kotz et al., Progress in Biomedical Optics and Imaging, 2019, vol. 10875, describes a high-throughput thermal replication of transparent fused silica glass.

SUMMARY OF THE INVENTION

In view of the above, it is an object of the present invention to overcome the above drawbacks associated with the manufacturing of metal molds known in the art. In particular, the technical problem underlying the present invention is to provide a method of manufacturing a metal mold, which should allow the provision of a metal mold in a cost-efficient manner so as to be extendible to an industrial scale, and at the same time, which should allow the provision of a metal mold having adequate surface properties, e.g. low roughness and absence of defects.

The above technical problem underlying the present invention has been solved by providing the embodiments characterized in the appended claims.

The present invention relates to a method of manufacturing a metal mold for replicating a component having a predetermined three-dimensional shape, the manufacturing method comprising: (a) fabricating a glass-based mold by using a moldable nanocomposite comprising an organic binder and glass particles dispersed therein, the glass-based mold having the predetermined three-dimensional shape; and (b) replicating the glass-based mold obtained in step (a) by melting a metal inside the glass-based mold or by melting a metal outside the glass-based mold and pouring it onto or into the glass-based mold, followed by cooling, or by pressing the glass-based mold into a malleable metal substrate, thereby obtaining the metal mold for replicating the component, the metal mold having the predetermined three-dimensional shape inverted. Further, the present invention relates to a method of replicating a component having a predetermined three-dimensional shape, wherein the metal mold obtained by the manufacturing method is used for replicating the component, wherein the glass particles of the moldable nanocomposite comprise a first type of glass particles having a diameter in the range from 5 nm to 500 nm.

DETAILED DESCRIPTION OF THE INVENTION

Figure 1:
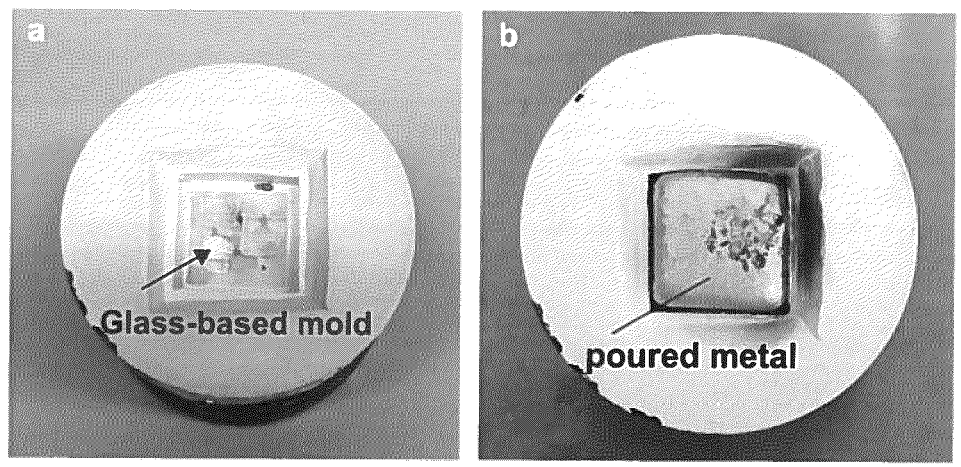
FIG. 1 shows (a) a glass-based mold and (b) a metal mold obtained by pouring molten metal onto the glass-based mold in accordance with the present invention.

In particular, in one aspect, the present invention provides a method of manufacturing a metal mold for replicating a component having a predetermined three-dimensional shape, the manufacturing method according to the present invention comprising:
  (a) fabricating a glass-based mold by using a moldable nanocomposite comprising an organic binder and glass particles dispersed therein, the glass-based mold having the predetermined three-dimensional shape and being obtained as follows:
    (i) shaping the moldable nanocomposite into the predetermined three-dimensional shape before, during and/or after hardening of the organic binder, thereby obtaining a primary structure;
    (ii) debinding the primary structure obtained in step (i) by removing the organic binder, thereby obtaining a secondary structure, the secondary structure having cavities formed therein;
    (iii) optionally filling the cavities of the secondary structure obtained in step (ii) with at least one glass-forming precursor; and
    (iv) sintering the secondary structure obtained in step (ii) optionally filled with at least one glass-forming precursor in step (iii), thereby obtaining the glass-based mold; and
  (b) replicating the glass-based mold obtained in step (a) by melting a metal inside the glass-based mold or by melting a metal outside the glass-based mold and pouring it onto or into the glass-based mold, followed by cooling, or by pressing the glass-based mold into a malleable metal substrate, thereby obtaining the metal mold for replicating the component, the metal mold having the predetermined three-dimensional shape inverted,
wherein the glass particles of the moldable nanocomposite comprise a first type of glass particles having a diameter in the range from 5 nm to 500 nm.

Advantageously, the manufacturing method according to the present invention which is characterized by the above-defined process steps allows the provision of a metal mold in a cost-efficient manner so as to be extendible to an industrial scale. The reason therefore lies in the glass-based mold obtained in step (a), which is subsequently replicated into the metal mold in step (b). In other words, according to the present invention, the manufacturing of the metal mold itself is a replication process, i.e. step (b) may be repeated several times, as required, thereby obtaining more than one metal mold using the same or a different glass-based mold. As a result, the manufacturing method according to the present invention does not suffer from the drawbacks which are particularly known from CNC machining techniques such as low throughput.

Advantageously, the manufacturing method according to the present invention which is characterized by the above-defined process steps also allows the provision of a metal mold having adequate surface properties, e.g. low roughness and absence of defects. The reason therefore lies in the use of a moldable nanocomposite comprising an organic binder and glass particles dispersed therein for fabricating the glass-based mold. Since the glass particles of the moldable nanocomposite are not molten, i.e. only the organic binder of the moldable nanocomposite needs to be in a moldable state, the glass-based mold can be fabricated in step (a) at comparatively low temperatures. For example, when fabricating the glass-based mold by means of a replication process using a template made of a polymeric material, the template is not degraded. In other words, according to the present invention, the template is neither exposed to molten glass nor exposed to molten metal. On the other hand, the glass-based mold obtained in step (a) is resistant towards high temperatures so that it can be contacted with molten metal in step (b). Since the metal mold is a direct replicate of the glass-based mold, which means that the metal mold has the shape of the glass-based mold inverted, the surface properties of the metal mold are substantially only affected by the surface properties of the glass-based mold. As a result, the manufacturing method according to the present invention does not suffer from the drawbacks which are particularly known from rapid tooling such as low resolution and inferior surface quality.

In the following, the manufacturing method according to the present invention with its specific process steps as defined above is described in detail.

In step (a) of the manufacturing method according to the present invention, a glass-based mold is fabricated by using a moldable nanocomposite comprising an organic binder and glass particles dispersed therein. The glass-based mold obtained in step (a) has the predetermined three-dimensional shape. According to the present invention, the nanocomposite used for fabricating the glass-based mold is moldable, which means that the organic binder thereof is in a moldable state. With the organic binder being in a moldable state, the moldable nanocomposite can be shaped so as to fabricate the glass-based mold having the predetermined three-dimensional shape.

According to the present invention, the glass-based mold is obtained in step (a) by the above-defined steps (i) to (iv). Before discussing steps (i) to (iv) in more detail, the composition of the moldable nanocomposite with the organic binder and the glass particles dispersed therein as essential parts is described first:

The organic binder of the moldable nanocomposite is not further limited as long as it is in a moldable state, i.e. as long as it is transferable to a moldable state, so that the moldable nanocomposite can be shaped in order to fabricate the glass-based mold.

In one embodiment of the present invention, the organic binder of the moldable nanocomposite is a thermoplastic which can be hardened upon cooling. Accordingly, cooling turns the softened thermoplastic into a solid so that the organic binder is no longer in a moldable state. As a result of hardening the thermoplastic used as the organic binder, the primary structure obtained in step (i) as described further below maintains its shape.

In case the organic binder is a thermoplastic, it may be selected from polyesters based on aromatic or aliphatic dicarboxylic acids and diols and/or hydroxycarboxylic acids, polycarbonates based on aliphatic or aromatic diols, polyolefins such as polyethylene, polypropylene, polybutene, polymethylpentene, polyisobutene, poly(ethylene-vinyl acetate), ethylene propylene rubber (EPR), poly(ethylene propylene diene), poly(vinyl butyral) (PVB), polyacrylates and polymethacrylates, cycloolefin polymers, as well as polyamides, polyacetals such as polyoxymethylene, polyethers such as polyethylene glycol (PEG), including aromatic polyethers based on bisphenols, or polyurethanes, or a combination thereof, without, however, being limited thereto.

In another embodiment of the present invention, the organic binder of the moldable nanocomposite is a resin which can be hardened upon curing or polymerizing initiated by an external stimulus. In this context, as the external stimulus, heat or irradiation, in particular UV irradiation, may be mentioned. In some cases, mixing may be even sufficient as the external stimulus, e.g. in two-part resins, where the liquid constituents of the resin exhibit a sufficient reactivity towards each other. Further, as required, the external stimulus may include an initiator added to the organic binder for facilitating curing or polymerizing of the organic binder. Suitable initiators are known to the skilled person, such as acetophenones, e.g. 2,2-dimethoxy-2-phenylacetophenone (DMPAP), azo compounds, e.g. azobisisobutyronitrile (AIBN), benzophenone derivatives, fluorescein and its derivatives, e.g. rose bengal, quinones, e.g. camphorquinone, and phosphine derivatives, e.g. diphenyl (2,4,6-trimethylbenzoyl)phosphine oxide, without, however, being limited thereto. Accordingly, curing or polymerizing initiated by the external stimulus turns the liquid constituent(s) of the resin into a solid so that the organic binder is no longer in a moldable state. When exposed to the external stimulus, depending on the resin used, the resin is either cured which leads to a crosslinked structure or it is polymerized which leads to a non-crosslinked structure. In other words, the term "resin" as used herein not only encompasses thermosetting resins but also encompasses thermoplastic resins. That is, as the resin, any monomeric and/or oligomeric and/or polymeric composition may be mentioned herein without limitation. As a result of hardening the resin used as the organic binder, the primary structure obtained in step (i) as described further below maintains its shape.

In case the organic binder is a resin, it may be selected from acrylate resins and methacrylate resins, unsaturated polyester resins, vinyl ester resins, epoxy resins, thiol-ene resins, or polyurethane resins, without, however, being limited thereto. In particular, in case the organic binder is a resin, 2-hydroxyethyl methacrylate (HEMA) or a mixture of 2-hydroxyethyl methacrylate and tetraethylene glycol diacrylate (TEGDA) may be mentioned as the organic binder.

Apart from the organic binder, the moldable nanocomposite comprises glass particles as an essential part. The glass particles are dispersed in the organic binder. Dispersion of the glass particles can be achieved by any means known in the art, depending on the organic binder used. In case a thermoplastic is used as the organic binder, the thermoplastic may be softened or it may be dissolved in a suitable organic solvent or gas phase before adding the glass particles thereto. In case a resin is used as the organic binder, the glass particles may be directly added to the liquid constituent(s) of the resin.

In a preferred embodiment of the present invention, the glass particles of the moldable nanocomposite are fused silica glass particles. Fused silica glass is characterized in that it consists of high-purity amorphous silicon dioxide. Herein, fused silica glass is to be understood as glass with a mass fraction of silicon dioxide being at least 99% based on the total mass of the glass, with typical impurities such as Al, Ca, Cu, Fe, Na, K, Li and Mg amounting to less than 15 ppm, respectively. That is, fused silica glass does not substantially contain any ingredients which are typically added to other sorts of glass with the intention to lower the melting point thereof. As such, fused silica glass exhibits high thermal stability so that it can withstand the temperatures when contacted with molten metal in step (b) as described further below.

According to the present invention, the glass particles of the moldable nanocomposite comprise glass particles having a diameter in the range from 5 nm to 500 nm, preferably in the range from 7 nm to 400 nm. These glass particles are also referred to as the first type of glass particles. It is the first type of glass particles having a diameter in the nanometer range which makes the moldable composite comprising the organic binder and the glass particles dispersed therein a moldable nanocomposite.

In addition to the glass particles having a diameter in the range from 5 nm to 500 nm, preferably in the range from 7 nm to 400 nm, the glass particles of the moldable nanocomposite may comprise glass particles having a diameter in the range from 2 µm to 50 µm, preferably in the range from 2 µm to 40 µm. These glass particles are also referred to herein as the second type of glass particles. In case the glass particles comprise the first type of glass particles and the second type of glass particles, i.e. comprise a bimodal mixture of glass particles, the glass particles having the smaller diameter can fill the interstices between the glass particles having the larger diameter. Thereby, a denser packing of the glass particles in the moldable nanocomposite is achieved, which in turn leads to a smaller shrinkage during sintering in step (iv) as described further below. In principle, the glass particles may further comprise any other type of glass particles with a diameter different from that of the first type of glass particles and different from that of the second type of glass particles. Such multimodal mixtures of glass particles are also within the scope of the present invention.

Herein, the diameter of the first, second and any other type of glass particles is to be understood as the mean average diameter which is measured in accordance with ISO 9276-2. According to the present invention, it is not required that the glass particles are (perfectly) spherical. That is, the glass particles may also be spheroidal, i.e. they may be sphere-like. For example, as regards the first type of glass particles with a diameter in the range from 5 nm to 500 nm, preferably in the range from 7 nm to 400 nm, this means that these glass particles may substantially have no dimension in which the diameter is smaller than 5 nm, preferably no dimension in which the diameter is smaller than 7 nm, and substantially no dimension in which the diameter is larger than 500 nm, preferably no dimension in which the diameter is larger than 400 nm.

Without being limited thereto, the content of the glass particles in the moldable nanocomposite is at least 5 parts per volume, preferably at least 30 parts per volume, and more preferably at least 50 parts per volume based on 100 parts per volume of the organic binder. The higher the content of the glass particles in the moldable nanocomposite, the denser the packing of the glass particles in the glass-based mold obtained in step (b) as described further below. As surprisingly found by the present inventors, even if the content of the glass particles in the moldable nanocomposite with respect to the organic binder is rather high, e.g. 55 parts per volume or more based on 100 parts per volume of the organic binder, it is still possible to shape the moldable nanocomposite in order to fabricate the glass-based mold.

Apart from the organic binder and the glass particles dispersed therein, the moldable nanocomposite may comprise one or more additional agents, as required, which facilitate the fabrication of the glass-based mold and the replication thereof into the metal mold. According to the present invention, it is preferable that the content of any additional agents taken as a whole in the moldable nanocomposite does not amount to more than 20 mass-%, more preferably not more than 15 mass-%, even more preferably not more than 10 mass-%, still even more preferably not more than 5 mass-%, with the total mass of the moldable nanocomposite being 100 mass-%. That is, the moldable nanocomposite according to the present invention essentially consists of the organic binder and the glass particles dispersed therein, including any initiator added to the organic binder. Herein, the term "essentially consists of" means that the content of the organic binder and the glass particles dispersed therein, including any initiator added to the organic binder, preferably amounts to at least 80 mass-%, more preferably at least 85 mass-%, even more preferably at least 90 mass-%, still even more preferably at least 95 mass-%, with the total mass of the moldable nanocomposite being 100 mass-%.

For example, in order to facilitate dispersion of the glass particles in the organic binder, a dispersion agent may be added. As the dispersion agent, alcohols, nonionic surfactants, e.g. polyoxyethylene alkyl ether or polyoxymethylene, and anionic surfactants, e.g. fatty acids and their salts or aliphatic carboxylic acids and their salts, such as stearic acid and its salts or oleic acid and its salts, may be mentioned herein without limitation. Another example of a dispersion agent which may be suitably used in the present invention is 2-[2-(2-methoxyethoxy)ethoxy]acetic acid. According to the present invention, it is not necessary that a dispersion agent is present. That is, the present invention also encompasses embodiments, where the moldable nanocomposite does not contain any dispersion agent.

In order to facilitate debinding of the primary structure in step (ii) as described further below, the moldable nanocomposite preferably further comprises a phase-forming agent dispersed in the organic binder. The phase-forming agent which is solid or viscous at room temperature, which is understood herein as a temperature of 25° C., forms an internal phase in the organic binder. Examples of the phase-forming agent include alcohols, ethers and silicone oils as well as combinations thereof, with these substances having a sufficiently high molecular weight and/or having appropriate functionalization so as to be solid or viscous at room temperature. Herein, the term "viscous" is to be understood as referring to a viscosity of at least 1 mPa·s at room temperature, as measured in accordance with DIN 53019. The phase-forming agent may be removed from the organic binder before or during debinding of the primary structure in step (ii) as described further below, e.g. by means of thermal treatment which leads to the evaporation or sublimation of the phase-forming agent, or which leads to its decomposition. Further, the phase-forming agent may be removed by means of solvent or gas phase extraction.

As a specific example, phenoxyethanol (POE) may be mentioned as the phase-forming agent. POE has a viscosity of about 30 mPa·s at room temperature, thus being a viscous substance. It can be evaporated at a temperature of 242° C. under atmospheric pressure. However, significant quantities thereof are already removed at lower temperatures due to its high vapor pressure. Further, PEG and 2-[2-(2-methoxyethoxy)ethoxy]acetic acid mentioned above may also act as the phase-forming agent.

Notably, once the primary structure has been formed, the organic binder is in a solid state (not a liquid, gel, or paste-like state). As known to the skilled person, a solid is characterized in that it is not possible to determine a viscosity thereof. Herein, the moldable nanocomposite does not contain any thickening agent nor does it contain any solvents like water. According to a specific embodiment of the present invention, the moldable nanocomposite neither contains triglycerides, waxes, and paraffin nor contains any plasticizer such as phthalates and any derivatives thereof.

In order to enhance the mechanical stability of the glass-based mold obtained in step (a), the moldable nanocomposite may further comprise a powder of a ceramic material or a precursor of a ceramic material dispersed in the organic binder. In this context, the term "powder of the ceramic material" means that the particles comprised in the powder are made of the ceramic material. In case the moldable nanocomposite comprises a powder of the ceramic material, the particles comprised in the powder need to have a suitable diameter, i.e. a suitable size, further to what has been outlined above for the glass particles. In addition, the term "precursor of the ceramic material" means that the ceramic material is formed from the precursor during sintering in step (iv) as described further below. In case the moldable nanocomposite comprises a precursor of the ceramic material, the precursor is at least one metal-containing compound which may be selected from the group consisting of organometallic compounds, metal complexes and metal salts, or a combination of two or more thereof. That is, the precursor of the ceramic material acts as the metal source for the ceramic material. In order to disperse the powder and/or the precursor of the ceramic material in the organic binder, the means outlined above for dispersing the glass particles in the organic binder are equally applicable here.

In step (i), the moldable nanocomposite which has been described above in detail is shaped into the predetermined three-dimensional shape before, during and/or after hardening of the organic binder. Thereby, a primary structure, also referred to as green body, is obtained. Depending on the organic binder used, hardening is either accomplished upon cooling or upon curing or polymerizing initiated by an external stimulus. The shape of the primary structure obtained in step (i) already reflects the shape of the glass-based mold obtained in step (iv) as described further below.

Shaping of the moldable nanocomposite into the predetermined three-dimensional shape can be accomplished by any suitable means known in the art. In particular, the moldable nanocomposite may be shaped in step (i) by means of a subtractive manufacturing process, an additive manufacturing process, a replication process, or a combination thereof. Depending on the process(es) applied, the organic binder with the glass particles dispersed therein is hardened before, during and/or after shaping of the moldable nanocomposite.

In case of subtractive manufacturing processes, the organic binder with the glass particles dispersed therein is hardened before shaping of the moldable nanocomposite. In other words, the moldable nanocomposite is shaped into the predetermined three-dimensional shape after hardening of the organic binder. Suitable subtractive manufacturing processes include but are not limited to laser-based structuring techniques as well as CNC machining techniques such as milling, drilling, grinding, sawing, lathing, and polishing.

In case of additive manufacturing processes, the organic binder with the glass particles dispersed therein is hardened during shaping of the moldable nanocomposite. In other words, the moldable nanocomposite is shaped into the predetermined three-dimensional shape during hardening of the organic binder. Suitable additive manufacturing processes include but are not limited to selective laser sintering and selective laser melting, fused filament fabrication, also referred to as fused deposition modeling, stereolithography, two-photon polymerization, inkjet printing as well as volumetric printing techniques.

In case of replication processes, the organic binder with the glass particles dispersed therein is hardened after shaping of the moldable nanocomposite. In other words, the moldable nanocomposite is shaped into the predetermined three-dimensional shape before hardening of the organic binder. Suitable replication processes include but are not limited to casting, injection molding, (injection) compression molding, extrusion, thermoforming, cold or hot drawing, hot embossing, nanoimprinting as well as blow molding.

In one embodiment of the present invention, the moldable nanocomposite is shaped in step (I) by casting the moldable nanocomposite against a template, followed by hardening. The template has the predetermined three-dimensional shape inverted. That is, the shape of the template is the inverse of the final three-dimensional shape of the component to be replicated. As such, the template has the shape of a molding tool for replicating the component. Accordingly, in this embodiment, the moldable nanocomposite is shaped in step (i) by means of a replication process.

As far as the material of the template is concerned, the present invention is not further limited. Since the template is neither exposed to molten glass nor exposed to molten metal, as mentioned above, there are no particular limitations with respect to the temperature resistance of the material as long as the template can be replicated into the glass-based mold in step (i).

For example, but without being limited thereto, the template is made of a polymeric material. The polymeric material may be derived from a thermoplastic or may be derived from a resin. Herein, the polymeric material is to be understood as not only encompassing carbon-based polymers. For example, the polymeric material also encompasses silicon-based polymers, e.g. polysiloxanes, also referred to as silicones. As required, in order to impart sufficient mechanical stability to the template, the polymeric material may be at least partially crosslinked. Partial crosslinking may be achieved by using a thermosetting resin, e.g. a suitable silicone resin which has, at least to some extent, three or more reactive functional groups per molecule.

As required, the template may be obtained in advance by means of a subtractive manufacturing process, an additive manufacturing process, a replication process, or a combination thereof. In this context, the means outlined above for shaping of the moldable nanocomposite are equally applicable here.

For example, but without being limited thereto, the template may be obtained in advance by means of microlithography. In microlithography, a photoresist on a substrate which is covered with a mask is irradiated. The photoresist can be either positive-type or negative-type. A negative-type photoresist is insoluble in developing solutions when having been irradiated before, i.e. those areas of the photoresist which have been irradiated through the mask are retained on the substrate and form the template. A positive-type photoresist is insoluble in developing solutions when not having been irradiated before, i.e. those areas of the photoresist which have not been irradiated through the mask are retained on the substrate and form the template. Suitable subtractive manufacturing processes include the CNC machining techniques as mentioned above, laser cutting and water jet cutting, without, however, being limited thereto. Suitable additive manufacturing processes include selective laser sintering and fused filament fabrication as mentioned above, two-photon polymerization, direct laser writing, and lithography, in particular stereolithography, without, however, being limited thereto.

In case the template is obtained in advance by means of a replication process, the template is replicated from an existing component having the predetermined three-dimensional shape. Herein, the existing component may be identical with the component to be replicated. As it is the case with the template, the existing component may be made of a polymeric material. Further, and as it is the case with the template, the existing component may be obtained in advance by means of a subtractive manufacturing process, an additive manufacturing process, a replication process, or a combination thereof. In this context, the considerations outlined above for the template are equally applicable to the existing component. The existing component may be replicated into the template by using a thermoplastic or a resin. In order to do so, the softened thermoplastic or the liquid constituent(s) of the resin is/are cast against the existing component. Hardening then yields a template made of a polymeric material. As mentioned above, the polymeric material not only encompasses carbon-based polymers, but also encompasses silicon-based polymers, for instance.

As already mentioned above, in order to shape the moldable nanocomposite into the predetermined three-dimensional shape, one or more subtractive manufacturing processes, additive manufacturing processes, and replication processes may be combined. For example, when the moldable nanocomposite is shaped by means of a replication process and the primary structure has visible artefacts resulting from said replication process, subtractive or additive manufacturing processes may be applied to the primary structure as post-processing. In particular, in case the primary structure is obtained by casting the moldable nanocomposite against a template, such post-processing may be readily applied. Suitable means for post-processing are known to the skilled person, including the CNC machining techniques as mentioned above, without, however, being limited thereto. The above considerations are equally applicable to the template and to the existing component.

In step (ii), the primary structure obtained in step (i) is debound by removing the organic binder. Thereby, a secondary structure, also referred to as brown body, is obtained. As a result of debinding, i.e. removing the organic binder, the secondary structure has cavities formed therein.

Depending on the organic binder used, the primary structure obtained in step (i) may be debound in step (ii) by means of thermal treatment, chemical reaction, reduced pressure, solvent or gas phase extraction, or a combination thereof. For example, the primary structure may be first immersed in a solvent for carrying out solvent extraction before being thermally treated. In principle, any means may be applied which can remove the organic binder without adversely affecting the glass particles, and, if present, the powder and/or precursor of a ceramic material, which form the secondary structure. In this context, a person skilled in the art routinely selects appropriate conditions to be applied for removing the organic binder in step (ii).

For example, in case debinding is accomplished by means of thermal treatment, the temperature applied during debinding is typically in the range from 100° C. to 600° C., e.g. in the range from 150° C. to 550° C., the heating rate is typically in the range from 0.1° C./min to 5° C./min, e.g. in the range from 0.5° C./min to 1° C./min, and the holding time is typically in the range from 2 minutes to 12 hours, depending on the size of the glass-based mold to be obtained. In case the size thereof is rather small, already a few seconds may be sufficient for debinding the primary structure in step (ii). Thermal treatment may also be carried out in a stepwise manner. In accordance with the above considerations, debinding by means of thermal treatment can be further facilitated by means of reduced pressure, i.e. sub-atmospheric pressure, which renders the organic binder more volatile.

After removal of the organic binder, the glass particles, and, if present, the powder and/or precursor of a ceramic material, adhere together due to hydrogen bonds. Thereby, mechanical stability is imparted to the secondary structure. Taking account of the size of the glass particles, the diameter of which lies in the nanometer range, the glass particles have a high specific surface area which allows for sufficient interaction to keep the secondary structure mechanically stable.

Before the organic binder is removed in step (ii), or during the removal of the organic binder, the phase-forming agent, if present, is removed from the primary structure, e.g. by evaporation or sublimation, or by decomposition. Removal of the phase-forming agent, if present, can also be accomplished by means of solvent or gas phase extraction. In principle, the same means may be applied as described above in connection with the removal of the organic binder.

As a result of removing the phase-forming agent, if present, debinding of the primary structure in step (ii) is facilitated. The reason therefore is that the internal phase formed by the phase-forming agent in the organic binder generates pores in the primary structure when it is removed. Through these pores, the organic binder which remains can then be removed in a more controlled manner. Thereby, the secondary structure is more easily prevented from being damaged, in particular when it adopts a thick structure. The same applies when the organic binder is removed in several steps. For example, in case the organic binder is a combination of two or more binder components exhibiting different thermal decomposition behavior, debinding may be accomplished sequentially. In this case, after having removed the first binder component, i.e. the binder component with the lowest decomposition temperature, the removal of the further binder component(s) is facilitated due to the pores generated in the primary structure after removal of the first binder component.

In step (iii) which is optional, the cavities of the secondary structure obtained in step (ii) may be filled with at least one glass-forming precursor. The at least one glass-forming precursor, also referred to as filler, necessarily has a suitable size so that it can be introduced into the cavities formed in the secondary structure. By filling the cavities of the secondary structure with at least one glass-forming precursor, shrinkage of the secondary structure during sintering in step (iv) as described further below can be reduced. Besides, by selecting a suitable glass-forming precursor, the hardness of the resulting glass-based mold can be increased and/or its thermal coefficient of expansion can be modified, e.g. it can be minimized. Herein, the at least one glass-forming precursor is not further limited and may be selected in an appropriate manner based on the intended purpose.

Without being limited thereto, silicon-based glass-forming precursors like tetraethyl orthosilicate ($Si(OC_2H_5)_4$), also referred to as TEOS, may be used, for instance. In particular, glass-forming precursors may be used herein which form glass that is not distinguishable from that of the glass particles in the moldable nanocomposite. However, it is also possible to use glass-forming precursors herein which form glass that is distinguishable from that of the glass particles in the moldable nanocomposite. For example, when the moldable nanocomposite comprises fused silica glass particles as the glass particles, it is also possible to use a titanium-based glass-forming precursor like tetraethyl orthotitanate ($Ti(OC_2H_5)_4$). Other metal alkoxides which may be used herein include titanium isopropoxide, titanium ethoxide, zirconium ethoxide, aluminium isopropoxide, vanadyl isopropoxide, niobium ethoxide, tantalum ethoxide, and potassium tert-butoxide. Further suitable glass-forming precursors are known to the skilled person. These may be used herein as well.

In case the glass particles in the moldable nanocomposite are fused silica glass particles and the cavities of the secondary structure are filled with a silicon-based glass-forming precursor like TEOS, a glass-based mold made of highly pure fused silica glass having a density comparable to conventionally processed fused silica glass can be obtained. As a result, the glass-based mold obtained in step (a) is particularly resistant towards high temperatures. Even if the secondary structure is not filled with a glass-forming precursor in step (iii), the Vickers hardness of the glass-based mold obtained after sintering in step (iv) is comparable to conventionally processed fused silica glass.

The cavities of the secondary structure may be filled with the at least one glass-forming precursor in step (iii) by immersing the secondary structure in a solution containing the at least one glass-forming precursor, exposing the secondary structure to physical or chemical vapor deposition in an atmosphere containing or generating the at least one glass-forming precursor, or a combination thereof. However, in principle, any other filling process may be applied in this respect as well. For example, it is also possible to apply a sol-gel process. Depending on the at least one additive with which the cavities of the secondary structure are optionally filled in step (iii), the secondary structure may be first immersed in a solution containing one of the glass-forming precursors, and may then be exposed to physical or chemical vapor deposition containing or generating another one of the glass-forming precursors. As appropriate, the cavities of the secondary structure may be filled with the at least one glass-forming precursor even before debinding of the primary structure is completed. In this case, it is the partially debound primary structure which is filled with the at least one glass-forming precursor.

In step (iv), the secondary structure obtained in step (ii) optionally filled with at least one glass-forming precursor in step (iii) is sintered. Thereby, the glass-based mold is obtained.

Suitable sintering conditions are known to the skilled person and are routinely selected as appropriate. Without limitation, the temperature applied during sintering is typically in the range from 700° C. to 1600° C., the heating rate is typically in the range from 1° C./min to 10° C./min, e.g. 5° C./min, and the holding time is typically in the range from 0.5 hours to 8 hours, e.g. 4 hours, depending on the size of the glass-based mold to be obtained. In case the moldable nanocomposite comprises a precursor of a ceramic material dispersed in the organic binder, and/or in case the cavities of the secondary structure are filled with a glass-forming precursor in step (iii), the secondary structure may be pre-sintered at an intermediate temperature in order to convert the precursor of the ceramic material into the ceramic material, and/or in order to convert the glass-forming precursor into glass. For example, pre-sintering may be carried out at a temperature in the range from 400° C. to 700° C.

In case the glass particles dispersed in the moldable nanocomposite are fused silica glass particles, it is possible to select both a comparatively high heating rate as well as a comparatively high cooling rate, taking account of the low coefficient of thermal expansion and taking account of the high thermal shock resistance of fused silica glass.

According to the present invention, sintering does not require the application of pressure. On the contrary, sintering in step (iv) can be suitably carried out at a pressure below atmospheric pressure, e.g. at a pressure of at most 0.1 mbar, preferably at most 0.01 mbar, and particularly preferably at most 0.001 mbar. Since sintering can be carried out at atmospheric pressure or even below, there are no particular requirements to be complied with in the present invention regarding the sintering furnace.

After sintering, the obtained glass-based mold can be cooled to room temperature and subsequently replicated into the metal mold in step (b) as described further below.

In step (b) of the manufacturing method according to the present invention, the glass-based mold obtained in step (a) by carrying out steps (i) to (iv) is replicated by melting a metal inside the glass-based mold or by melting a metal outside the glass-based mold and pouring it onto or into the glass-based mold, followed by cooling, or by pressing the glass-based mold into a malleable metal substrate. Thereby, the metal mold for replicating the component is obtained. The metal mold has the predetermined three-dimensional shape of the component to be replicated inverted. A metal mold obtained by pouring molten metal onto a glass-based mold in accordance with the present invention is shown in FIG. 1.

As far as the metal is concerned, the present invention is not further limited. For example, the metal may be selected from the group consisting of nickel, aluminum, copper, zinc, and tin, or may be an alloy of these or other metals, such as brass, bronze, or $AlMg_7Si_3Mn$ which is a multicomponent alloy.

Depending on the shape of the glass-based mold, which corresponds to the shape of the component to be replicated, the metal may be molten inside the glass-based mold or may be molten outside the glass-based mold and poured onto or into the glass-based mold. After completion thereof, the metal is solidified by cooling. On the other hand, as appropriate, the glass-based mold may be pressed into a metal substrate. In order to do so, the metal substrate needs to be malleable, either at room temperature or at elevated temperature. Metals which can be suitably pressed include but are not limited to aluminum and copper. The metal mold can be used as obtained and does not require any post-processing. However, the metal mold may be subjected to postprocessing, e.g. by means of subtractive or additive manufacturing processes, in order to remove features present in the template or in order to add features not present in the template used for fabricating the glass-based mold, for instance.

Figure 2:
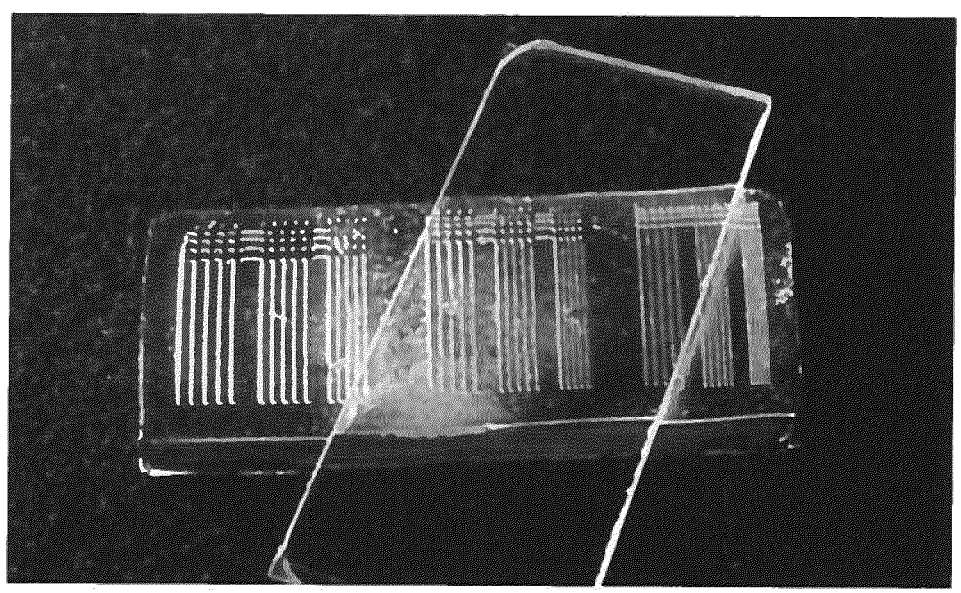
FIG. 2 shows a replicated component along with the metal mold used for replicating the component. The replicated component is made of poly(methyl methacrylate).

In another aspect, the present invention provides a method of replicating a component having a predetermined three-dimensional shape. In the replication method according to the present invention, the metal mold obtained by the manufacturing method according to the present invention as described above is used for replicating the component. A replicated component is shown in FIG. 2 along with the metal mold used for replicating the component.

According to the present invention, the component may be replicated by any replication process known in the art using the metal mold obtained in accordance with the present invention. For example, the component may be replicated by means of injection molding, blow molding, hot embossing, thermoforming, or injection compression molding, without, however, being limited thereto.

As far as the material of the component to be replicated is concerned, the present invention is not further limited, either. In a preferred embodiment of the present invention, the replicated component is made of a polymeric material. The polymeric material may be derived from a thermoplastic or may be derived from a resin in the same manner as outlined above for the template.

The present invention with the above-described manufacturing method allows the provision of a metal mold in a cost-efficient manner so as to be extendible to an industrial scale, and at the same time, allows the provision of a metal mold having adequate surface properties, e.g. low roughness and absence of defects. In contrast to the manufacturing methods known in the art, the predetermined three-dimensional shape of the component to be replicated is transferred into the metal mold without the need of any shape-defining step as it is required in subtractive or additive manufacturing. Surprisingly, the transfer of the predetermined three-dimensional shape can be accomplished on the basis of a glass-based mold having the predetermined three-dimensional shape, which is obtained during the manufacturing. Once the glass-based mold has been obtained, the step of replicating the glass-based mold into the metal mold may be repeated several times, as required, using the same or a different glass-based mold.

In addition, the present invention with the above-described replication method allows the provision of a replicated component which can be suitably used in various technical fields. In particular, due to the adequate surface properties of the metal mold, which are transferred into the replicated component, the latter is particularly suited in the field of optics, e.g. as a lens, where high precision is essential.

Example

The present invention is further illustrated by the following Working Example without, however, being limited thereto.

First, a microfluidic channel as the component to be replicated was obtained by means of microlithography. For replicating the microfluidic channel into a template, a two-part resin based on polydimethylsiloxane was cast against the microfluidic channel, followed by hardening, i.e. curing which was initiated by mixing as the external stimulus, leading to a crosslinked structure.

Subsequently, the template was replicated using a moldable nanocomposite comprising an organic binder and glass particles dispersed therein. As the moldable nanocomposite, a commercially available product was used ("Glassomer L50", a room-temperature liquid fused silica nanocomposite which can be hardened upon curing with UV irradiation). For replicating the template into a glass-based mold, the moldable nanocomposite was cast against the template, followed by hardening, i.e. curing with UV irradiation. After debinding by means of thermal treatment and after sintering, a glass-based mold made of highly pure fused silica glass was obtained. The moldable nanocomposite used herein allowed the facile replication of the template into a temperature-stable glass-based mold.

Next, nickel was molten at a temperature of 920° C. and poured onto the glass-based mold for replicating the glass-based mold into a metal mold. After cooling to room temperature, a high-quality metal mold was obtained which could be used as obtained for replicating the microfluidic channel as the component to be replicated.

Figure 3:
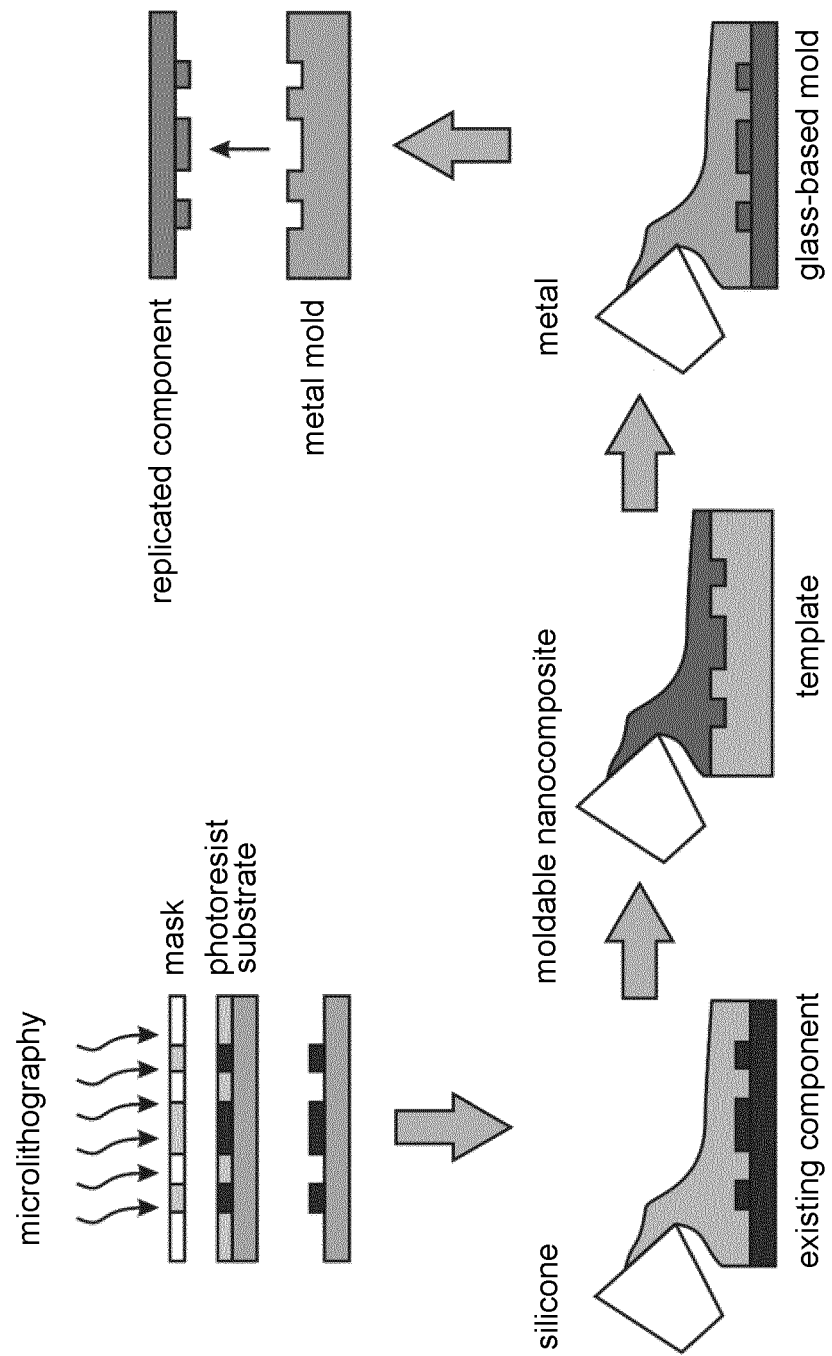
FIG. 3 shows the manufacturing of the metal mold obtained in the Working Example described below in a schematic manner.

The manufacturing of the metal mold obtained herein is shown in FIG. 3 in a schematic manner.

Figure 4:
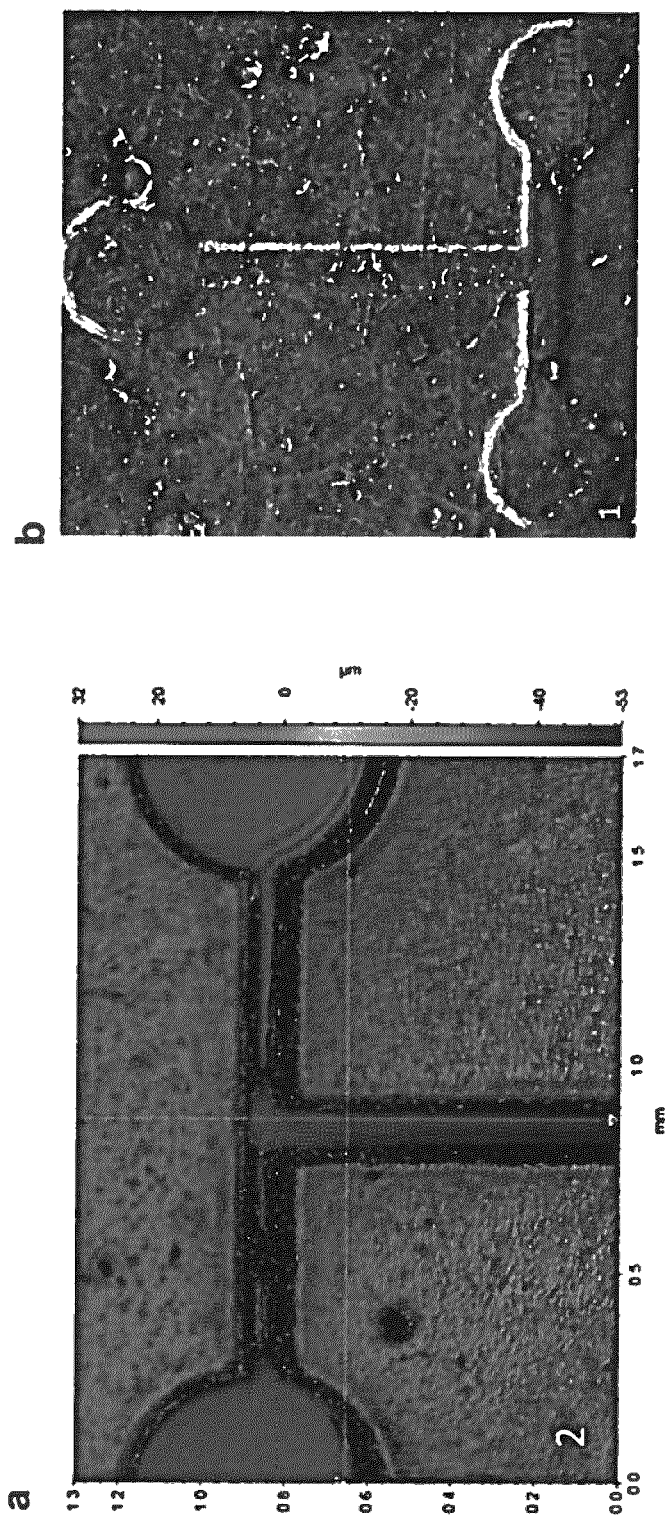
FIG. 4 shows the evaluation of the metal mold obtained in the Working Example described below: (a) white light interferometry of the metal mold; and (b) microscopy image of the metal mold.

As can be seen from the evaluation in FIG. 4, which shows (a) a white light interferometry and (b) a microscopy image, the metal mold obtained herein had the shape of the microfluidic channel replicated with high fidelity.

The invention claimed is:

1. A method of manufacturing a metal mold for replicating a component having a predetermined three-dimensional shape, the manufacturing method comprising:
   (a) fabricating a glass-based mold by using a moldable nanocomposite comprising an organic binder and glass particles dispersed therein, the glass-based mold having the predetermined three-dimensional shape and being obtained as follows:
      (i) shaping the moldable nanocomposite into the predetermined three-dimensional shape before, during and/or after hardening of the organic binder, thereby obtaining a primary structure;
      (ii) debinding the primary structure obtained in step (i) by removing the organic binder, thereby obtaining a secondary structure, the secondary structure having cavities formed therein;
      (iii) optionally filling the cavities of the secondary structure obtained in step (ii) with at least one glass-forming precursor; and
      (iv) sintering the secondary structure obtained in step (ii) optionally filled with at least one glass-forming precursor in step (iii), thereby obtaining the glass-based mold; and
   (b) replicating the glass-based mold obtained in step (a) by melting a metal inside the glass-based mold or by melting a metal outside the glass-based mold and pouring it onto or into the glass-based mold, followed by cooling, or by pressing the glass-based mold into a malleable metal substrate, thereby obtaining the metal mold for replicating the component, the metal mold having the predetermined three-dimensional shape inverted,
   wherein the glass particles of the moldable nanocomposite comprise a first type of glass particles having a diameter ranging from 5 nm to 500 nm.

2. The manufacturing method according to claim 1, wherein the organic binder of the moldable nanocomposite is a thermoplastic which can be hardened upon cooling.

3. The manufacturing method according to claim 1, wherein the organic binder of the moldable nanocomposite is a resin which can be hardened upon curing or polymerizing initiated by an external stimulus.

4. The manufacturing method according to claim 1, wherein the glass particles of the moldable nanocomposite are fused silica glass particles.

5. The manufacturing method according to claim 1, wherein the diameter of the first type of glass particles ranges the range from 7 nm to 400 nm.

6. The manufacturing method according to claim 1, wherein the glass particles of the moldable nanocomposite comprise a second type of glass particles having a diameter ranging from 2 µm to 50 µm in addition to the first type of glass particles.

7. The manufacturing method according to claim 1, wherein the moldable nanocomposite further comprises a phase-forming agent dispersed in the organic binder, the phase-forming agent being solid or viscous at room temperature and forming an internal phase in the organic binder.

8. The method according to claim 1, wherein the moldable nanocomposite is shaped in step (i) by means of a subtractive manufacturing process, an additive manufacturing process, a replication process, or a combination thereof.

9. The method according to claim 1, wherein the moldable nanocomposite is shaped in step (i) by casting the moldable nanocomposite against a template, followed by hardening, the template having the predetermined three-dimensional shape inverted.

10. The manufacturing method according to claim 9, wherein the template is made of a polymeric material.

11. The manufacturing method according to claim 9, wherein the template is obtained in advance by means of a subtractive manufacturing process, an additive manufacturing process, a replication process, or a combination thereof.

12. The manufacturing method according to claim 1, wherein the primary structure obtained in step (i) is debound in step (ii) by means of thermal treatment, chemical reaction, reduced pressure, solvent or gas phase extraction, or a combination thereof.

13. A method of replicating a component having a predetermined three-dimensional shape, the method comprising:
   (a) fabricating a glass-based mold by using a moldable nanocomposite comprising an organic binder and glass particles dispersed therein, the glass-based mold having the predetermined three-dimensional shape and being obtained as follows:
      (i) shaping the moldable nanocomposite into the predetermined three-dimensional shape before, during and/or after hardening of the organic binder, thereby obtaining a primary structure;
      (ii) debinding the primary structure obtained in step (i) by removing the organic binder, thereby obtaining a secondary structure, the secondary structure having cavities formed therein;
      (iii) optionally filling the cavities of the secondary structure obtained in step (ii) with at least one glass-forming precursor; and
      (iv) sintering the secondary structure obtained in step (ii) optionally filled with at least one glass-forming precursor in step (iii), thereby obtaining the glass-based mold; and
   (b) replicating the glass-based mold obtained in step (a) by melting a metal inside the glass-based mold or by melting a metal outside the glass-based mold and pouring it onto or into the glass-based mold, followed by cooling, or by pressing the glass-based mold into a malleable metal substrate, thereby obtaining the metal mold for replicating the component, the metal mold having the predetermined three-dimensional shape inverted; and
   (c) replicating the component using the metal mold, wherein the glass particles of the moldable nanocomposite comprise a first type of glass particles having a diameter ranging from 5 nm to 500 nm.

14. The replication method according to claim 13, wherein the component is replicated by means of injection molding, blow molding, hot embossing, thermoforming, or injection compression molding.

15. The replication method according to claim 13, wherein the replicated component is made of a polymeric material.

16. The replication method according to claim 13, wherein the diameter of the first type of glass particles ranges from 7 nm to 400 nm.

17. The replication method according to claim 13, wherein the glass particles of the moldable nanocomposite comprise a second type of glass particles having a diameter ranging from 2 μm to 50 μm in addition to the first type of glass particles.

18. The replication method according to claim 13, wherein the moldable nanocomposite further comprises a phase-forming agent dispersed in the organic binder, the phase-forming agent being solid or viscous at room temperature and forming an internal phase in the organic binder.

19. The replication method according to claim 13, wherein the moldable nanocomposite is shaped in step (i) by means of a subtractive manufacturing process, an additive manufacturing process, a replication process, or a combination thereof.

20. The method according to claim 13, wherein the moldable nanocomposite is shaped in step (i) by casting the moldable nanocomposite against a template, followed by hardening, the template having the predetermined three-dimensional shape inverted.

* * * * *